J. C. BRYAN.
Earth-Battery.
No. 160,152.
Patented Feb. 23, 1875.
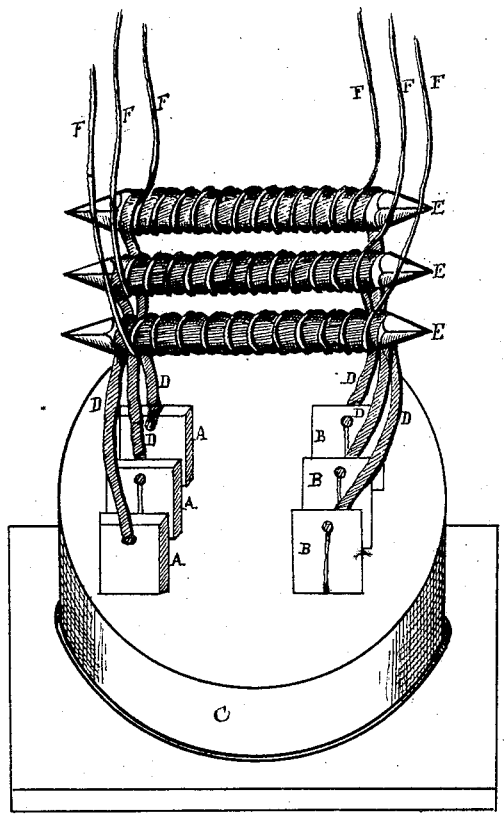
WITNESSES
Jos. T. K. Hant
Theophulus S. Kimmell
Jas. C. Bryan
INVENTOR
THE GRAPHIC CO.PHOTO-LITH.39 & 41 PARK PLACE,N.Y.

UNITED STATES PATENT OFFICE.

JAMES C. BRYAN, OF PHILADELPHIA, PENNSYLVANIA.

IMPROVEMENT IN EARTH-BATTERIES.

Specification forming part of Letters Patent No. 160,152, dated February 23, 1875; application filed January 27, 1875.

*To all whom it may concern:*

Be it known that I, JAMES CHAPMAN BRYAN, of the city of Philadelphia, State of Pennsylvania, have invented new and useful Improvements in Earth-Batteries for electro-magnetic purposes; and I do hereby declare the following to be a full and correct description of the same, reference being had to the accompanying drawings, and to the letters of reference marked thereon, making a part of this specification.

The object of my invention is to produce a current of electricity from an earth battery or batteries capable of generating a constant current of considerable intensity, to be used for lightning-rods and other purposes where voltaic batteries using solutions are now applied.

It is known that if different elements—for instance, sheets of zinc and copper—be buried or placed in the earth a current of electricity is generated; but I have discovered that if such elements be partly embedded in sulphur, so that the dampness of the earth may act in conjunction with the sulphur on the metals, a more intense current will be created. I utilize this in the following way: This current is collected by insulated wires coiled around nickel-plated steel magnets, which are planted north and south in the earth, to receive the magnetic current of the earth; a secondary coil or coils of insulated wire surrounds the coil or coils around the magnets, and receives, by induction, electricity from both the voltaic and magneto-electric batteries.

In the drawing, the voltaic battery is composed of several pieces or plates of chemically pure zinc, A, and the same number of copper, B. They are embedded in a cake of sulphur, C, and are connected by a large insulated wire, D, which, being the primary coil between dissimilar elements, is extended, without insulation, to the base of the sulphur cake C, and also in a spiral coil or coils around steel magnets E, which are pointed, magnetized, and nickel-plated.

These batteries are planted in the earth north and south, to receive the earth's current of electricity according to the magnetic poles. The primary coil or coils D are surrounded by a secondary insulated wire, F, in a spiral coil or coils, to receive, by induction, electricity from the batteries' current through D.

What I claim as my invention is—

1. The improved voltaic earth-battery, consisting of the metals A B, partially embedded in the sulphur C, as herein set forth.

2. The combination, with the voltaic earth-battery and primary coil, of the series of magnets forming the magneto-electric battery, substantially as herein described.

3. The combination, with the voltaic earth-battery, magneto-electric battery and primary coil, and the secondary coil F, substantially as herein set forth.

JAMES CHAPMAN BRYAN.

Witnesses:
JOS. T. K. PLANT,
THEOPLUS S. KIMMELL.